United States Patent [19]

Sarkisian et al.

[11] Patent Number: 5,276,559
[45] Date of Patent: Jan. 4, 1994

[54] TECHNIQUE FOR RECORDING AND REPRODUCING LOW RATE DATA IN A HELICAL VEHICLE SCAN RECORDER HAVING A STATIONARY TIME CODE SIGNAL REPRODUCE MAGNETIC HEAD

[75] Inventors: Nancy L. Sarkisian, Pasadena; James S. Bacon, Irvine; Jose G. Aguilar, Pico Rivera; Robert J. Evans, San Marino; Daniel Heritage, Baldwin Park; Boonsieng Benjauthrit, La Canada, all of Calif.

[73] Assignee: Datatape Incorporated, Pasadena, Calif.

[21] Appl. No.: 858,740

[22] Filed: Mar. 27, 1992

[51] Int. Cl.$^5$ .............................................. G11B 5/02
[52] U.S. Cl. ..................... 360/18; 360/33.1; 358/335
[58] Field of Search ............... 360/33.1, 72.2, 14.3, 360/25, 19.1, 18, 20, 27, 48, 61; 358/341, 342, 337, 335, 310

[56] References Cited

U.S. PATENT DOCUMENTS

| 4,134,130 | 1/1979 | Tachi | 360/14.3 |
|---|---|---|---|
| 4,167,028 | 9/1979 | Tobey | 360/72.2 |
| 4,167,759 | 9/1979 | Tachi | 360/14.3 |
| 4,503,470 | 3/1985 | Mita et al. | 360/33.1 |
| 4,532,557 | 7/1985 | Larkins | 360/33.1 |
| 4,663,678 | 5/1987 | Blum | 360/72.2 |
| 4,788,602 | 11/1988 | Sekiguchi et al. | 358/337 |
| 4,837,638 | 6/1989 | Fullwood | 360/14.3 |
| 5,018,036 | 5/1991 | Yamashita | 360/84 |

Primary Examiner—Edward P. Westin
Assistant Examiner—Que T. Le
Attorney, Agent, or Firm—William F. Noval

[57] ABSTRACT

A helical scan magnetic tape recorder includes a rotary scanner having magnetic heads which record and reproduce data on slant tracks of magnetic tape helically transported about the rotary scanner. Low frequency tones representing a time code or other digital information are recorded by the data heads of the rotary head scanner in the same lateral location such as preamble segments of the data tracks. The recorded time code is recovered by means of a stationary magnetic head. The recovered low frequency tones are converted into digital information such as a digital time code which provides tape location information for editing or searching purposes as well as other auxiliary information such as recorder serial number, data rate codes, etc.

5 Claims, 4 Drawing Sheets

TECHNIQUE FOR RECORDING AND REPRODUCING LOW RATE DATA IN A HELICAL VEHICLE SCAN RECORDER HAVING A STATIONARY TIME CODE SIGNAL REPRODUCE MAGNETIC HEAD

FIELD OF INVENTION

This invention relates in general to magnetic tape recording/reproducing apparatus and, more particularly, to a technique for recording and reproducing a time code or low rate data in a helical scan magnetic tape recorder which eliminates the need for a separate longitudinal track and which greatly enhances the ability to reproduce longitudinal tape positioning information at low reproduce tape speeds.

DESCRIPTION OF THE PRIOR ART

In magnetic tape recording and reproducing systems, a time code is frequently recorded on tape along with video, audio or digital data, in order to provide a means for locating a specific segment of the recorded information for editing or search purposes. Typically, the time code is recorded in a separate longitudinal track along the edge of the magnetic tape (see, for example, U.S. Pat. No. 4,503,470, issued Mar. 5, 1985, inventors Mita et al.; U.S. Pat. No. 4,532,557, issued Jul. 30, 1985, inventor Larkins). Design requirements usually specify that the time code positioning location information be recoverable at any tape speed and in any direction (forward or reverse). Reproduction of this time code information is accomplished using a fixed head arrangement on the magnetic tape reproducing apparatus. During reproduction, the magnetic head gap scans the magnetic flux changes as the tape moves past the head. This induces a voltage into the reproduce head winding that is proportional to the rate of change of flux. At high tape speeds relative to the longitudinal reproduce head, the flux change is sufficient to provide a signal-to-noise ratio (SNR) from which data can be recovered. However, as the tape speed relative to the longitudinal head decreases, the rate of change of flux also decreases. This, in turn, causes the SNR to decrease, making it increasingly more difficult to recover data.

There also exists a need to increase the amount of data which may be recorded on a given size of tape so that elimination of the time code track would permit increase of the length of recorded information tracks. One technique proposed for eliminating the longitudinal time code track is disclosed in U.S. Pat. No. 4,167,028, issued Sep. 4, 1979, inventor Tobey Therein is described a method of encoding a time code by pulse width modulating the normal frame reference pulses with a bit of elapsed record time signal. Another technique disclosed in U.S. Pat. No. 4,663,678, issued May 5, 1987, inventor Blum, provides for digital time code information being recorded interspersed on the same data track as analog audio message signals. Both of these techniques are disadvantageous in requiring the use of a longitudinal track. Another technique for recording time code information in either the vertical sync interval of a video signal or in a preamble of a digital data signal in helical scan magnetic tape recording apparatus is disclosed in U.S. Pat. No. 4,788,602, issued Nov. 29, 1988, inventors Sekiguchi et al.; and U.S. Pat. No. 4,837,638, issued Jun. 6, 1989, inventor Fullwood Although the technique disclosed in the latter two patents eliminates the need for recording a time code in a longitudinal track, the time code can only be read when the rotating reproduce head is properly positioned over the recorded slant track containing the time code. This is difficult when the tape is being scanned rapidly in a search mode.

There is also a need to eliminate the longitudinal control track to increase the amount of data which can be recorded.

Another problem with longitudinal tracks (control, time code), is that they can be read by rotary heads resulting in corrupt reproduced data. Because recording geometries are larger, longitudinal recordings have larger magnetic fields. When a longitudinal track is sensed by rotary reproduce heads, reproduce channel amplifiers tend to saturate and take an appreciable amount of time to recover. Moreover, the magnetic field of a recorded longitudinal track can be sensed by fast moving rotary heads without making contact with the longitudinal track. For this reason, large guard bands are required to separate longitudinal data from rotary data. These guard bands, along with the longitudinal track itself, reduce the available surface area for rotary scanning

SUMMARY OF THE INVENTION

According to the present invention, there is provided a technique for recording and reproducing tape positioning information and other low rate data by the use of a digital information (such as a time code) which is recorded as low frequency tones at the same lateral location in recorded data tracks. The low frequency tones are reproduced by means of a stationary magnetic head with the proper azimuth angle which recovers the frequency tones as the tape is moved longitudinally. The technique of the invention greatly enhances the ability to reproduce longitudinal tape positioning information and other low frequency data at low reproduce tape speeds with acceptable signal to noise ratio. The technique eliminates the need for a separate time code longitudinal track and/or control longitudinal track, thus increasing the length of data tracks to increase the storage of information on the magnetic tape, and eliminates auxiliary record and reproduce heads and related circuitry, decreasing weight and power and effecting simpler packaging configurations.

DESCRIPTION OF THE PREFERRED EMBODIMENTS

Figure 1:
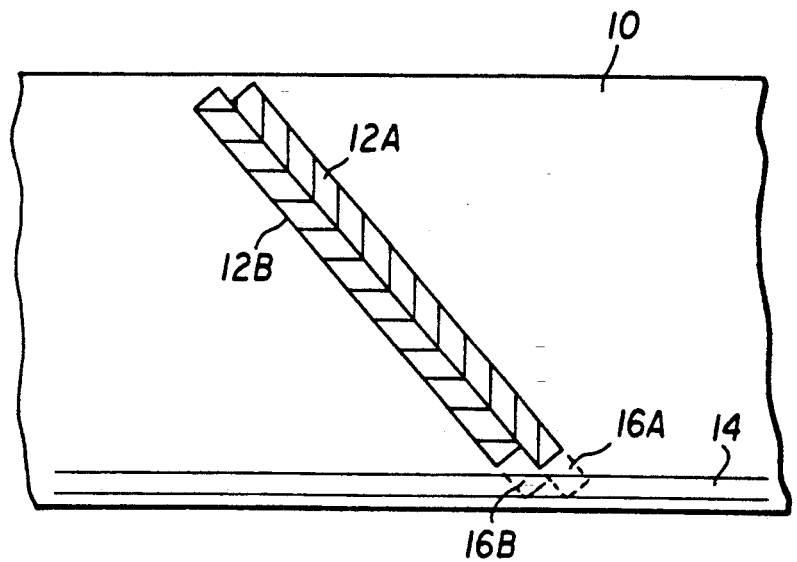
FIGS. 1 and 2 are diagrammatic views of magnetic tape, useful in illustrating the present invention.

Referring to FIG. 1, there is shown a diagrammatic view of magnetic tape 10 used in a helical scan magnetic tape recorder. Tape 10 includes a plurality of slanted data tracks 12A and 12B, recorded by means of rotary azimuth recording heads while the tape is transported in a helical path relative to the rotary head scanner. A longitudinal time control track 14 is provided along one edge of tape 10 for recording a digital time code. The time code provides tape positioning information for searching or editing purposes. As shown by the dotted line portions 16A and 15B, if time code track 14 were eliminated, data tracks 12A and 12B could be extended to include portions 16A and 16B, thereby increasing the data recording capability of tape 10.

Figure 2:
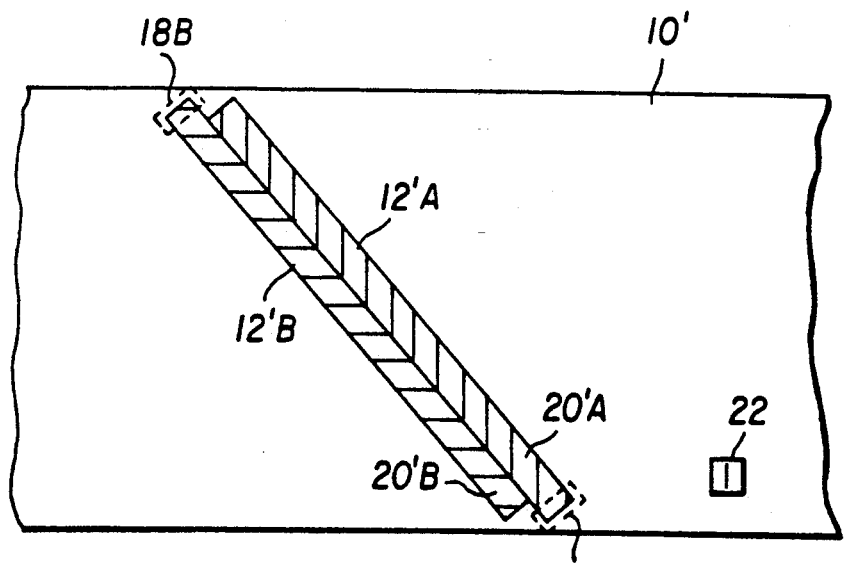

According to the present invention, as shown in FIG. 2, tape 10' includes extended data tracks 12A' and 12B' which are recorded by means of odd and even azimuth recording heads 18A and 18B. Tracks 12A' and 12B' have preamble segments 20A' and 20B' which, according to the present invention, include low frequency tones which are recorded on tracks 12'A and 12'B by heads 18A and 18B. Upon reproduction, a stationary magnetic head 22, having a head gap which has the same azimuth as odd track 12'A, reproduces the low frequency time code tones as longitudinal tape positioning information. The elimination of the time code track allows extension of the recorded tracks 12'A and 12'B and consequent increase of the amount of data recorded therein.

Figure 3:
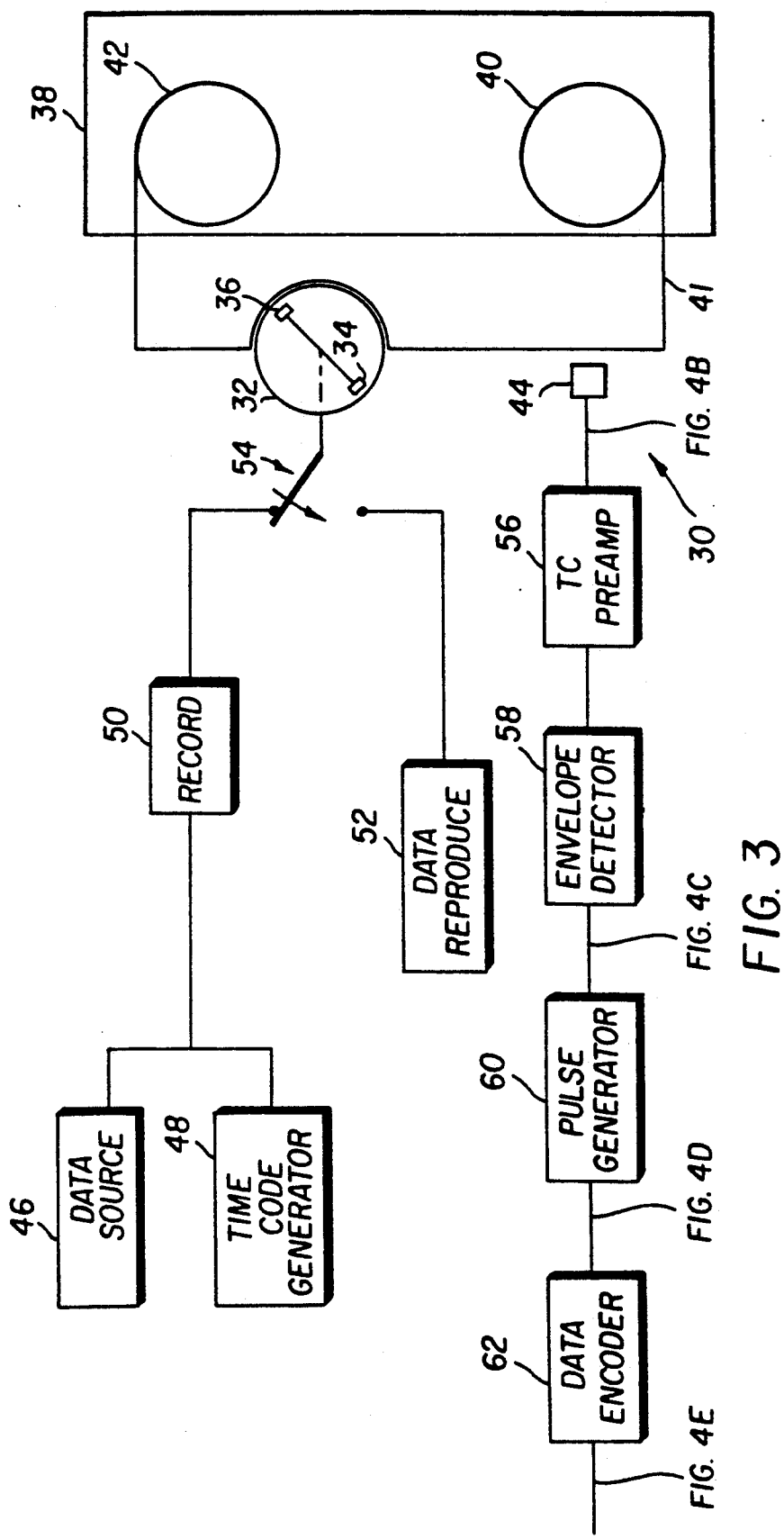
FIG. 3 is a block diagram of a helical scan magnetic tape recorder incorporating an embodiment of the present invention.

Referring now to FIG. 3, there is shown a block diagram of a representative helical scan magnetic tape recording/reproducing apparatus incorporating an embodiment of the present invention. As shown, apparatus 30 includes a rotary scanner 32 having oppositely disposed record/reproduce magnetic heads 34, 36 which have magnetic head gaps of respective opposite azimuth angles. A cassette 38 of magnetic tape 40 carried on reels 42 and 44 of cassette 38 is received in apparatus 30. Magnetic tape 40 can also be supplied in a cartridge or separate reels. Magnetic tape is transported in known fashion in a helical path about rotary scanner 32 and past longitudinal time code magnetic head 44. Apparatus 30 also includes digital data source 46, time code generator 48, record circuit 50, data reproduction circuit 52, record/reproduce switch 54, time code signal preamplifier 56, envelope detector 58, pulse generator 60 and data encoder 62.

When apparatus 30 is operated in the record mode, digital data is provided to record circuit 50 by data source 46, along with time code information generated by time code generator 48. Switch 54 is switched to the record mode and the time code signal and digital data are recorded on magnetic tape 41 by means of odd and even azimuth rotating magnetic heads 34 and 36. According to the invention, in the case of azimuth recording, the time code data is encoded into the preamble of every odd azimuth data scan. In azimuth heads with a ± azimuth angle (e.g., ±15°). For example, the azimuth angle is defined as the rotation with respect to a line perpendicular to the track center line. Odd data scans are defined as tracks recorded with the −15° azimuth angle magnetic head. Even data scans are recorded with a +15° azimuth angle magnetic head.

Figure 4:
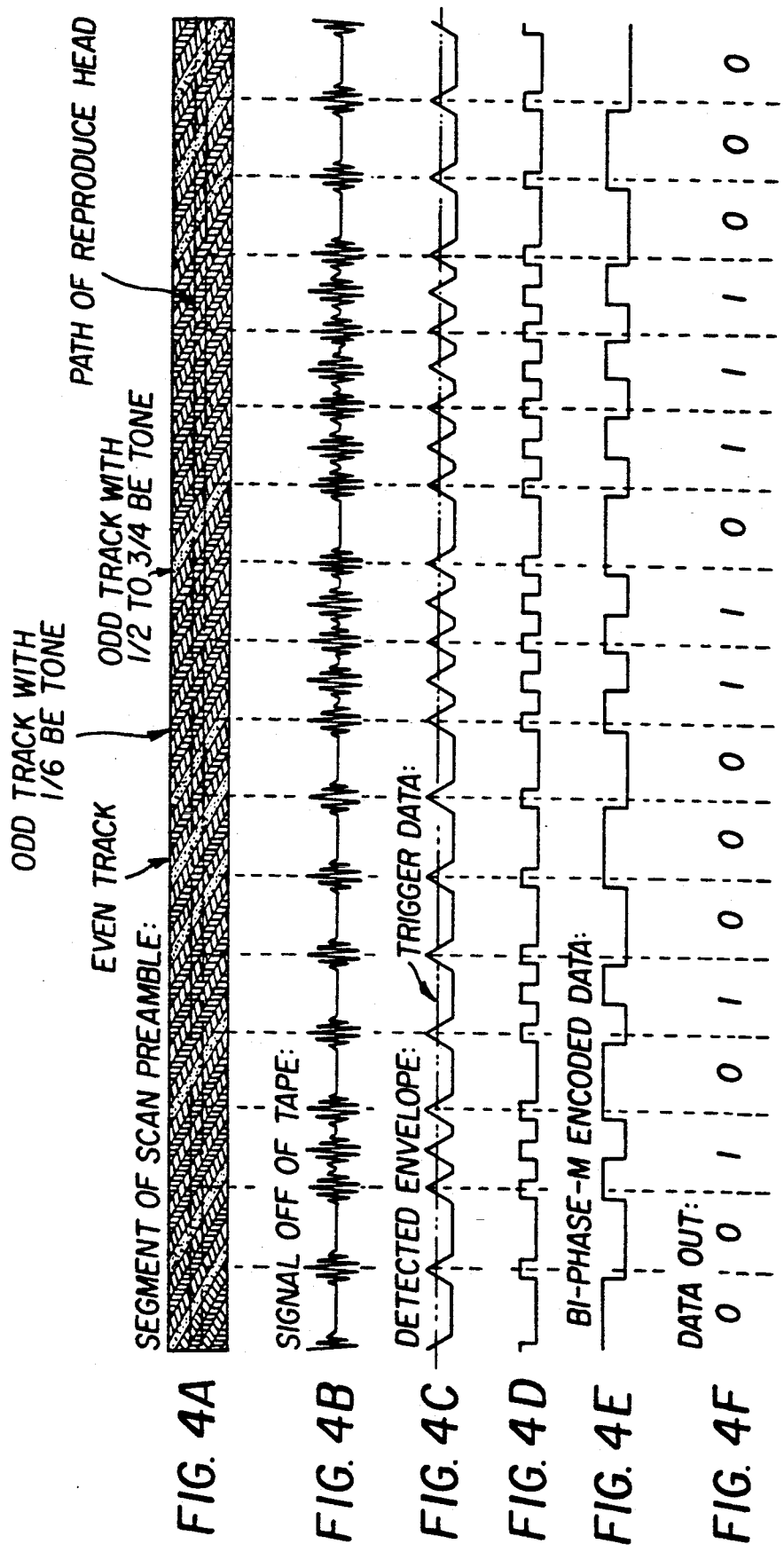
FIGS. 4A–4F are diagrammatic representations useful in describing the operation of the circuit of FIG. 3.

According to the invention, in a fixed lateral location such as a scan preamble segment at the beginning of each odd track, a low frequency tone is recorded to represent a digital bit 0 while a higher frequency tone is used to represent a digital bit 1. During reproduction, switch 54 is moved to a reproduction position. Magnetic heads 34 and 36 scan respective odd and even data tracks on magnetic tape and reproduce a stream of digital data which is processed in known manner by data reproducing circuit 52. Time code head 44 is located spaced from rotary head scanner 32 and reproduces the low frequency time code signals recorded on the odd data tracks. The path of time code reproduce head 44 is illustrated in FIG. 4A, which shows the scan preamble segments of a plurality of odd and even data tracks. A signal transition is recorded in an odd track with a low frequency of one-sixth of the band edge of the data frequency. A lack of signal transition is recorded in an odd track with one-half to three-fourths of the band edge of the data frequency. The gap length of magnetic head 44 is larger than the one-half wavelength of the higher frequency tone. This ensures that head 44 does not sense a signal when the higher frequency tone is recorded in the preamble. Thus, a narrow pass filter is not required to read time code data. Head 44 will only sense the low frequency tones recorded in the preamble. The presence or absence of a signal from the head corresponds to a digital signal transition or no signal transition, respectively.

The signal reproduced from magnetic tape 41 by head 44 is shown in FIG. 4B. This signal is amplified by time code signal preamplifier 56 and applied to envelope detector circuit 58. The output of detector circuit 58 is shown in FIG. 4C as a series of triangular waveforms. In the example shown, the time code is recorded in a bi-phase encoding scheme. In the bi-phase code, the signal is self-clocking. This allows the data track to be read at any magnetic tape reproduce speed. With a bi-phase encoding scheme, every other odd data scan defines a bit cell. Transitions are used to delineate bit cell periods. Transitions occur when a low frequency tone in the preamble is detected. Mid-cell transitions are used to indicate the binary value of the bit cell. Using a Bi-Phase mark scheme cell transition, a mid-cell transition (low frequency tone) defines a binary 1. The lack of a mid-cell transition (high frequency tone) defines a binary 0.

Pulse generator circuit 60 produces series of pulses as shown in FIG. 4D. Bi-phase data encoder 62 encodes the pulse train of FIG. 4D into a bi-phase mark encoded data stream as shown in FIG. 4E, wherein a binary 0 is represented by a single signal transition and a binary 1 is represented by two signal transitions. This is shown in FIG. 4F where the digital data time code is represented by the numerals 0, 0, 1, 0, 1, 0, 0, 0, 1, 1, 0, 1, 1, 1, 0, 0, 0.

Additionally, it is possible to record auxiliary information (such as recorder serial number or user supplied data rate codes, etc.) in uniquely identified frames intermixed with the time code frames. In fact, recorder telemetry data in the form of status words could be recorded on this information channel.

Figure 5:
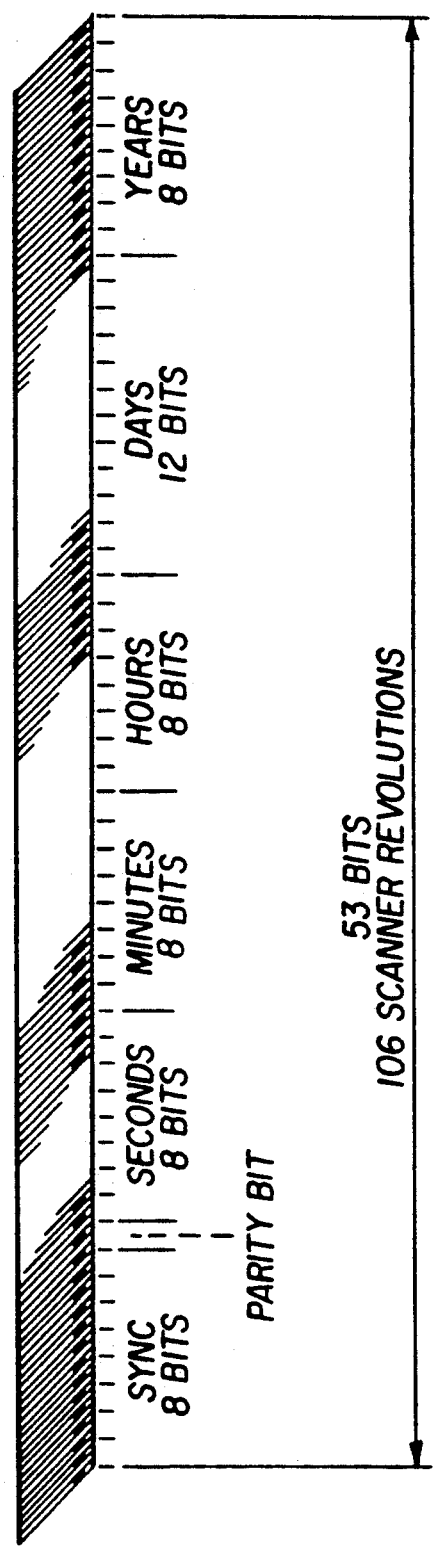
FIG. 5 is a diagram illustrating a time code format useful in carrying out the present invention.

As shown in FIG. 5, a time code format is illustrated in which 53 bits of information are recorded in 106 odd data tracks and 212 odd and even data tracks. The exemplary time code format shown includes a sync signal of 8 bits, a parity bit, seconds, minutes, and hours, respectively, represented by 8 bits, days represented by 12 bits, and years represented by 8 bits. It will be understood that other time code formats may also be used, such as the 80 bit SMPTE time code format used in the broadcast industry and developed by the Society of Motion Picture and Television Engineers. It will be noted, however, that the exemplary format of FIG. 5 uses fewer bits than the SMPTE time code format and, thus, provides greater longitudinal tape position resolution.

Although a specific bi-phase encoding scheme has been described above, it will be understood that other encoding schemes are contemplated to be within the scope of the present invention. Moreover, where guard bands are used between data tracks, azimuth head recording need not be used. In such case, the time code reproduce magnetic head has a head gap aligned with the magnetic head of the record/reproduce heads of the rotary head scanner. Each data track can have a bit of a digital time code or other information such that the absence or presence of a recorded low frequency tone represents a "1" or a "0" bit. Moreover, if azimuth magnetic head recording/reproducing is used for the recording scheme, two time code heads having opposite azimuth magnetic head gaps can be provided. In such case, time code bit information could be recorded in each even and odd azimuth track so that every track could be used for time code or tape position information.

INDUSTRIAL APPLICABILITY AND ADVANTAGES

The time code tape location system disclosed is useful in recording and playing back time code information in helical scan magnetic tape recorders used in consumer, commercial, industrial and government recording applications. The system has the advantages of simpler record and playback circuitry, insensitivity to reproduce magnetic tape speed and increased data recording capability.

Although the invention has been described with reference to preferred embodiments thereof, it will be understood that variations and modifications can be effected within the spirit and scope of the invention as described above and as defined in the appended claims.

What is claimed is:

1. A helical scan magnetic tape recorder comprising:
   a rotary head scanner, including at least one rotating magnetic head;
   means for transporting magnetic tape along a path past said rotary head scanner, such that said magnetic head records sequential slant tracks of information on said magnetic tape;
   means for supplying a low frequency digital information tone to said record head, whereby said head records said tone in the same predetermined lateral location in selected tracks recorded on said tape;
   a stationary reproduce magnetic head located along said tape path to reproduce the digital information tones recorded on said slant tracks of said tape; and
   circuit means for processing said reproduced tones into a digital information signal.

2. A helical scan magnetic tape recorder comprising:
   a rotary head scanner including rotating odd and even azimuth magnetic heads;
   means for transporting tape along a path past said rotary head scanner such that said odd and even azimuth magnetic heads record alternating, sequential, odd and even slant tracks of information signals on said magnetic tape;
   means for supplying low frequency time code tone signals to one of said odd or even azimuth magnetic heads whereby said one head records said time code tone signal in the same predetermined lateral location in alternate tracks recorded on said tape;
   a stationary time code signal reproduce magnetic head having an azimuth of said one head, and located along said tape path to reproduce said time code signals recorded in said alternate tracks on said tape; and
   circuit means for processing said reproduced time code signals into an encoded time code signal which is indicative of longitudinal tape position.

3. The recorder of claim 2 wherein said time code signals are recorded on said magnetic tape at a signal frequency which is a fraction of the signal frequency of said information signals and wherein said time code signal reproduce magnetic head has a magnetic gap which only reproduces said time code signals but not said information signals.

4. The recorder of claim 2 wherein said time code is recorded in a bi-phase encoding scheme such that low frequency tones recorded in two sequential alternate information tracks represents a digital "1" bit and a low frequency tone followed by no low frequency tone recorded in two sequential alternate information tracks represents a digital "0" bit.

5. The recorder of claim 4 wherein said circuit means includes an envelope detector for detecting the reproduced time code signal envelope, a pulse generator for producing a series of pulses from said detected time code signal envelope, and a data encoder for producing an encoded time code signal.

* * * * *